Feb. 6, 1945.                P. H. TAYLOR                    2,368,899
                        QUICK RELEASE MECHANISM
                         Filed Sept. 14, 1942
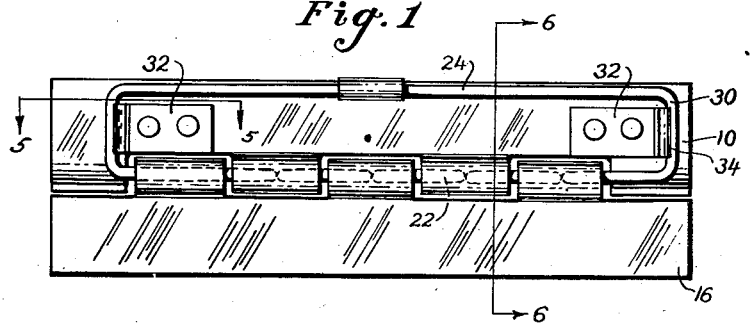
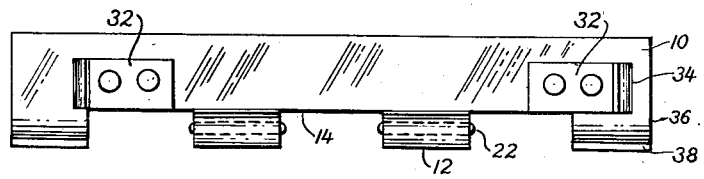
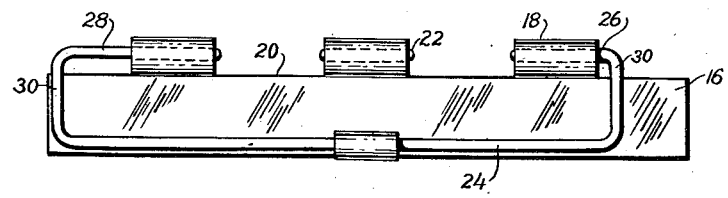
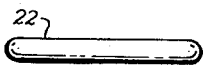
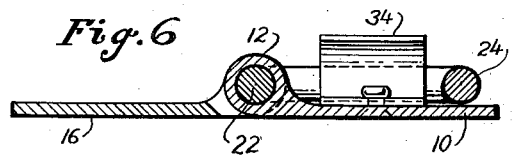
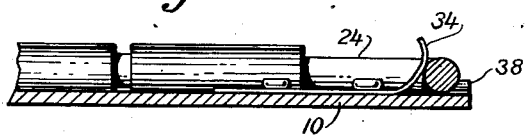
INVENTOR
PAUL H. TAYLOR.
BY
ATTORNEY Patented Feb. 6, 1945

2,368,899

UNITED STATES PATENT OFFICE 2,368,899

QUICK RELEASE MECHANISM

Paul H. Taylor, North Tonawanda, N. Y., assignor to Curtiss-Wright Corporation, a corporation of Delaware Application September 14, 1942, Serial No. 458,325

4 Claims. (Cl. 16—176)

This invention relates to a quickly releasable hinge mechanism which may be used for quick release of emergency doors, life rafts, or of an emergency floatation gear.

It is an object of this invention to provide a quickly releasable securing means between two members. In the conventional hinge connection between two members it is necessary to move the hinge pin its entire length before the hinge parts may be separated. It is an object of this invention to provide a hinge connection in which a relatively short movement of the hinge pin means is sufficient to effect release of the hinge parts. It is a further object of this invention to provide a quick release hinge mechanism in which the hinge may be of any desired length but the movement of the hinge pin means necessary to release the hinge parts is approximately only equal to one-half the length of the hinge joint notches.

Further objects will be apparent in reading the annexed detailed description in connection with the drawing, in which:

Fig. 1 is a plan view of the novel securing hinge means;

Figs. 2 and 3 are plan views of the respective hinge parts;

Fig. 4 is an enlarged view of one of the hinge pins;

Fig. 5 is an enlarged sectional view of line 5—5 of Fig. 1; and

Fig. 6 is an enlarged sectional view on the line 6—6 of Fig. 1.

Referring to the drawing, a hinge plate 10 is provided with spaced cylindrical or tubular portions or knuckles 12 having notched portions therebetween. A hinge plate 16 is similarly provided with tubular portions or knuckles 18 having notched portions 20 therebetween. The tubular portions 12 and 18 and notches 14 and 20 of the plates 10 and 16 are of such length that the tubular portions may be alined as in a conventional hinge, as illustrated in Fig. 1. For the sake of clearness, the clearance between the various parts has been exaggerated on the drawing. Hinge pins 22 are provided in each of the tubular portions 12 and 18 except in the two end tubular portions 18. A slidable U-shaped member or operator 24 has extensions 26 and 28 extending into the end tubular portions 18 of plate 16, as illustrated in Fig. 3.

With the pins 22 and member 24 in the position illustrated in Figs. 2 and 3, the plates 10 and 16 may be brought together with the tubular portions 12 and 18 in alinement and the pins 22 abutting each other. The member 24 may then be shifted to the right to move the hinge pins to the position illustrated in Fig. 1 whereby the plates 10 and 16 are securely hinged together. Plates 10 and 16 may be quickly detached merely by shifting member 24 to the left the short distance necessary to move each pin 22 so that they are substantially enclosed by their respective tubular portions 12 or 18. As illustrated, the tubular portions 12 and 18 are of substantially the same length while the interposed notches are slightly larger to provide the necessary clearance. Therefore, as illustrated, the hinge pins 22 are all of the same length and the member 24 is adapted to shift the pins so that they extend approximately half way into the adjacent tubular portion to securely hinge plates 10 and 16 together. Thus, it is merely necessary to move member 24 a distance approximately equal to half the length of pins 22 in order to separate the plates. Extensions 26 and 28 of member 24 are of such length that the bent ends 30 of member 24 cooperate with the end tubular portions 18 to act as a stop means for limiting the movement of member 24 to approximately half the length of pins 22. Thus, the member 24 may be quickly moved from one extreme position to the other to quickly release the plates 10 and 16. Obviously, member 24 may have any desired shape or construction, and separate stop means may be provided thereon to properly limit its movement. Plate 10 is provided with resilient clamp members 32 which are adapted to hold member 24 in the hinge position to prevent release of the plates 10 and 16 by accidental shifting of member 24. Each clamp includes a spring finger 34 which prevents accidental shifting of member 24. Plate 10 is also provided with flanges 36 having bent ends 38 which cooperate with the member 24 to help aline the plates preparatory to shifting the member 24 to hinge the plates together. Also, if desired, means may be provided to prevent pins 22 from falling out when the plates 10 and 16 are separated.

It is to be noted that the various tubular portions 12 and 18 need not be of the same length. It is merely necessary that these portions of each plate be adapted to be interfitted and alined, that the hinge pins 22 correspond to the length of their respective tubular portions, and that the member 24 be arranged to shift the pins to bridge the gap between adjacent tubular portions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a pair of members having a hinge joint therebetween comprising a plurality of interfitted alined hinge knuckles and a composite hinge pin disposed within said knuckles, said composite pin comprising a plurality of sections disposed in abutting relationship and being longitudinally movable to aline or disaline said pin sections with the adjoining ends of the hinge knuckles to respectively permit or prevent separation of said members, the end sections of said composite pin projecting beyond the knuckles of said hinge joint, and guide means cooperable with the projecting end sections of said composite pin to help aline the hinge knuckles of said members prior to assembly of said hinge joint.

2. In combination, a pair of members having a hinge joint therebetween comprising a plurality of interfitted alined hinge knuckles and a composite hinge pin disposed within said knuckles, said composite pin comprising a plurality of sections disposed in abutting relationship and being longitudinally movable to aline or disaline the abutting junctions of said sections with the adjoining ends of the hinge knuckles to respectively permit or prevent separation of said members, and flange means on one of said members adjacent the opposed ends of said hinge joint, said flange means being cooperable with a portion of said composite pin projecting from the hinge knuckles on the other of said members to help aline the hinge knuckles of said members prior to assembly of said hinge joint.

3. In combination, a pair of members having a hinge joint therebetween, said joint comprising a plurality of alined hinge knuckles and a composite hinge pin disposed within said knuckles, said composite pin comprising a plurality of abutting sections longitudinally movable to aline the abutting junctions of said sections with the adjoining ends of the hinge knuckles to permit assembly or disassembly of said hinge joint, and a pair of flanges adjacent the opposed ends of said hinge joint and cooperable with portions of said composite pin projecting from said hinge knuckles to facilitate alinement of the hinge knuckles prior to assembly whereupon said composite pin may be moved longitudinally to prevent disassembly of said hinge joint.

4. In combination, a pair of members having a hinge joint therebetween, said joint comprising a plurality of alined hinge knuckles and a composite hinge pin disposed within said knuckles, said composite pin comprising a plurality of abutting sections longitudinally movable to prevent or permit separation of said hinge joint, and a pair of guide flanges disposed adjacent the opposed ends of said hinge joint, each of said flanges extending from one of said members and being engageable with a portion of said composite pin projecting from the hinge knuckles on the other of said members for simultaneously alining all the hinge knuckles of said members prior to assembly of said hinge joint.

PAUL H. TAYLOR.